Nov. 11, 1958

F. A. STEARN

SWITCH CONTROL APPARATUS 2,860,212

Filed Jan. 11, 1957

2 Sheets-Sheet 1

INVENTOR
F. STEARN
BY
[signature]
ATTORNEY

Nov. 11, 1958

F. A. STEARN 2,860,212

SWITCH CONTROL APPARATUS

Filed Jan. 11, 1957

2 Sheets-Sheet 2

INVENTOR
F. STEARN
BY [signature]
ATTORNEY

United States Patent Office 2,860,212
Patented Nov. 11, 1958

2,860,212

SWITCH CONTROL APPARATUS

Franklin Andrus Stearn, Westfield, N. J., assignor to International Telephone and Telegraph Corporation Application January 11, 1957, Serial No. 633,578

6 Claims. (Cl. 200—159)

The present invention relates to electrical switch actuating apparatus and more particularly to apparatus for selectively operating a plurality of electrical switches.

It is an object of the present invention to provide a plurality of pressure operated switches which may be selectively operated by a lever mechanism.

It is another object of the invention to incorporate a selective pressure operated switch arrangement within a telephone handset for the purpose of controlling electrical equipment.

The above-mentioned and other features and objects of the invention and the manner of attaining them will become more apparent and the invention itself will be best understood by reference to the following description of an embodiment of the invention taken in conjunction with the accompanying drawings in which.

It has been chosen to illustrate this invention in connection with a telephone handset of the type which fits into a cradle in a horizontal plane. However, it should be understood that the embodiment is not limitative and the invention may be utilized in any appropriate form and is to be limited only by the breadth of the claims hereunto appended.

Figure 1:
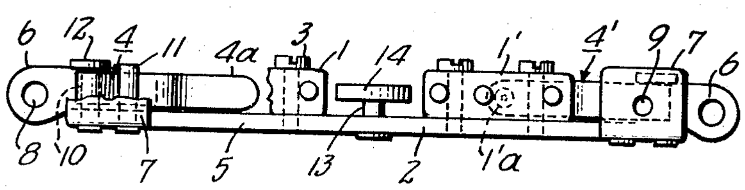
Figure 1 is a front view of a pair of pressure operated switches mounted on a frame as utilized in one embodiment of my invention.
Figures 2, 3:
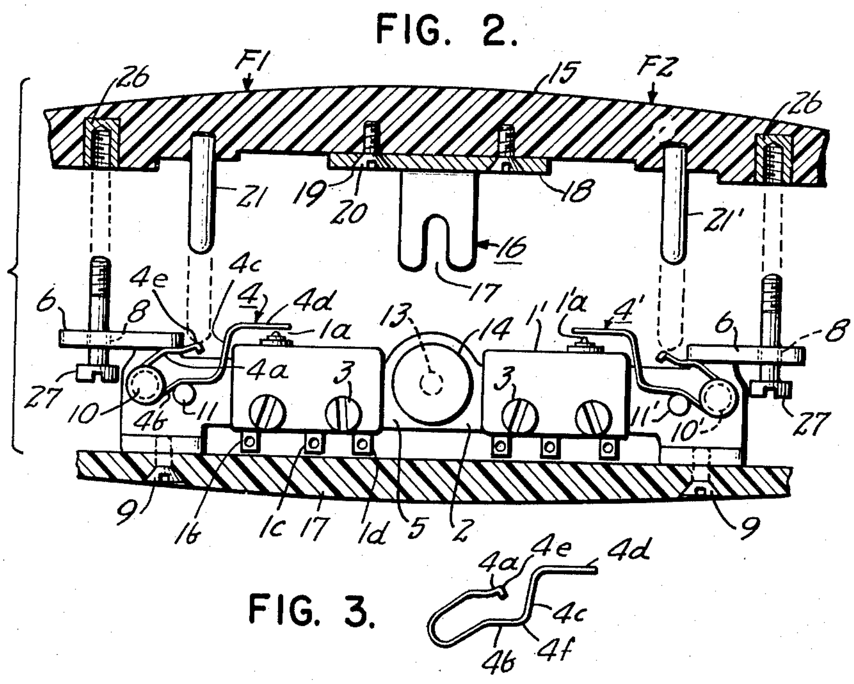
Fig. 2 is a plan view of the frame and switches of Fig. 1, together with a rocker arm for selectively actuating the switches shown in exploded form.
Fig. 3 is a diagrammatic representation of a spring element used to transfer to the switches the force exerted by the rocker arm shown in Fig. 2.

Referring now to Fig. 1, there is shown a front view of a pair of pressure operated switches 1 and 1′ attached to a mounting frame 2 by means of screws 3 which extend through said switches and into the frame 2. The switches are of the type known to the trade as "micro-switches," and include an operating plunger 1*a* and connecting terminals 1*b*, 1*c* and 1*d*, as shown in Fig. 2.

The switch terminals 1*b*, 1*c*, 1*d*, are adapted to be suitably electrically connected for the external circuits. While the switches illustrated are of the single pole double-throw type, any other switch contact arrangement may be used.

The control plungers 1*a*, 1′*a* are adapted to be operated by spring elements 4 and 4′, respectively. As shown in Fig. 3, each spring element is formed in a generally hairpin shape and having legs 4*a* and 4*b* of unequal length. The longest leg 4*b* extends beyond the shorter leg and has a portion 4*c* which is substantially normal to the plane of the shorter leg. The extremity 4*d* of the longest leg is substantially parallel to the plane of the shortest leg. As will be later explained, the end 4*e* of the leg 4*a* is adapted to be urged in a direction against the portion 4*f* of the leg 4*b* to cause the extremity 4*d* to be moved in the same direction. The profile of spring 4 can be appreciated from Fig. 3. The spring 4′ has an identical but reverse configuration of the spring 4.

To return to Figs. 1 and 2, it will be seen that the frame 2 is provided with a pair of identical lug portions 6 outwardly extending from opposite ends thereof and which portions are perpendicular to the plane of the main body 5 of said frame. Each of the lugs 6 is provided with an aperture 8. Adjacent the lugs 6 and extending outwardly from the other side of said frame 2, there are provided a pair of additional identical lug portions 7. The lug portions 7 are in a plane parallel to the plane of the lug portions 6 and are provided with threaded apertures 9 through which apertures suitable screws or fastening devices may be inserted to anchor the frame 2 fixedly, as will be later described.

I further provide two pairs of studs 10, 11, 10′, 11′, each pair extending perpendicularly outward from the main body 5 of the frame 2 adjacent opposite ends of said support and in a direction parallel to the lugs 6 and 7. The stubs of each pair are spaced from each other. The stub 10 is provided with a cap portion 12 and the spring element 4 is adapted to have its hairpin curve bent therearound. Portion 4*b* of element 4 is adapted to bear against the stud 11 as will be seen from Figs. 1 and 2. The portion 4*d* is adjacent plunger 1*a* of switch 1 and is adapted to coact with same when the end 4*e* is urged against the portion 46 at a point intermediate the bearing surface afforded by stud 11 and the portion 4*c*. The spring 4 is thus deformed around stud 11 and causes the portion 4*d* to contact and then actuate plunger 1*a*. Spring element 4′ operates similarly to the manner described in connection with spring 4.

In the middle of frame 2 there is provided a fixed pivot 13 extending outwardly from the main body 5 in a direction parallel to the direction of the studs 10, 10′ and 11, 11′. The pivot 13 is provided at its end with a wide flange 14, so that a narrow bearing surface is provided between the inside of the flange 14 and the side 5 of the frame 2.

There is further provided a rocker arm 15 which may be made of any suitable material, in the center of which is mounted a bifurcated element 16 having a space between its legs slightly wider than the diameter of the pivot 13. The element 16 is adapted to fit over the pivot 13 between the flange 14 and the portion 5 of the frame 2. The element 16 is provided with a pair of lug portions 18 disposed at opposite ends of its base and which lug portions are normal to the plane of its legs. The lug portions 18 are provided with apertures 19 through which fastening devices 20 may be inserted to hold the element 16 firmly to the rocking lever 15. Equi-distantly spaced from opposite sides of the element 16 are a pair of actuating pins 21 and 21′, which pins extend outwardly from the rocking element 15 in a direction parallel to the plane of the legs of element 16. The spacing of the elements 21 and 21′ from the element 16 is substantially equal to the distance from the pivot 13 to the ends 4*e* and 4′*e* of the springs 4, 4′, respectively.

The operation of the rocking lever 15 is such that when a force F1, indicated by the arrow, is applied to the left end of the rocking lever 15, the pin 21 will abut against the end 4*e* of the spring 4 to compress it against portion 4*f* of the spring 4. As the end 4*e* continues to move under urging of pin 21, the stud 11 acts as a bearing surface around which the spring 4 is deformed and the spring end 4*d* is caused to move in a direction toward the plunger 1*a* and ultimately contacts the plunger and forces it into the body of the switch, causing the switch contacts to move accordingly. As the force F1 is applied, the distance between the pin 21′ and spring 4′ is lengthened due to the rocking of lever 15, and the switch 1*a*, therefore, cannot be actuated. If it is desired to acutate the switch 1′, force is applied to the right end of rocking lever 15 in the direction of the arrow F2, causing the pin 21′ to contact the portion 4′*e* of the spring 4′ and causing the operation of switch 1′ in the manner similar to that described in connection with the operation of switch 1. It will be appreciated that as the force F2 is applied, the pin 21 cannot make contact with its corresponding spring 4, so that selectively, either of the switches 1 or 1′ may be operated, depending upon which side of the rocking lever 15 a force is applied.

A non-limitative use has been devised for my novel switching control arrangement in connection with a telephone handset. In some instances it is desirable to control external circuits by actuating a switch element connected with the handset. The switching arrangement lends itself very suitably for such an application and the balance of this specification will be devoted to a detailed description of any embodiment of the invention including a handset utilizing the invention.

Figure 4:
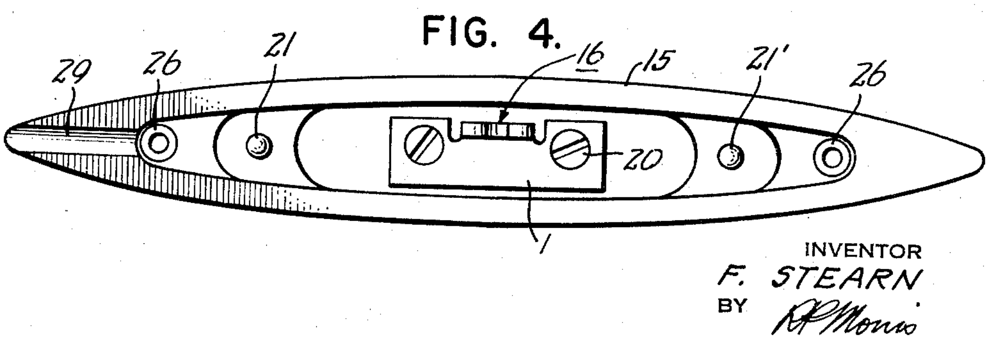
Fig. 4 is a bottom view of a rocker arm used in one embodiment of my invention.

In Fig. 4 there is shown a bottom view of a rocker arm 15 which rocker arm is in the shape of an inverted vessel with elliptical sides and having the bifurcated element 16 and the actuating pins 21, 21′ fastened to the floor of the hollow portion of the vessel. The rocker arm 15 is adapted to movably fit within the complementary cavity 22 of the handle 23 of a telephone handset, indicated generally as 24, shown more particularly in Figs. 6 and 7. The bottom of the cavity 22 is provided with a pair of apertures 25 extending through the handle 23 from the opposite side of which screws (not shown) may be inserted through the wall of the handle to extend into the threaded apertures 9 of the frame 2, thereby holding the frame firmly within the cavity 22 of the handle 23.

Figure 5:
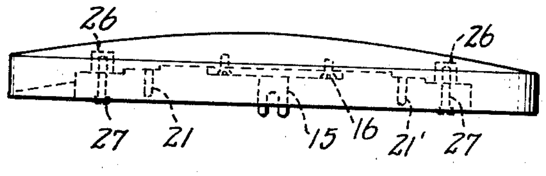
Fig. 5 is a side elevation of the showing of Fig. 4.

The rocking lever 15 is further provided with a pair of spaced threaded ferrules 26 into which ferrules a pair of threaded studs 27 (Fig. 5) are adapted to pass with suitable clearance through apertures 8 of the lugs 6 attached to the frame 2. The studs 27 are in the nature of guides and maintain the bifurcated element 16 into engagement with the pivot 13.

Figures 6, 7, 8:
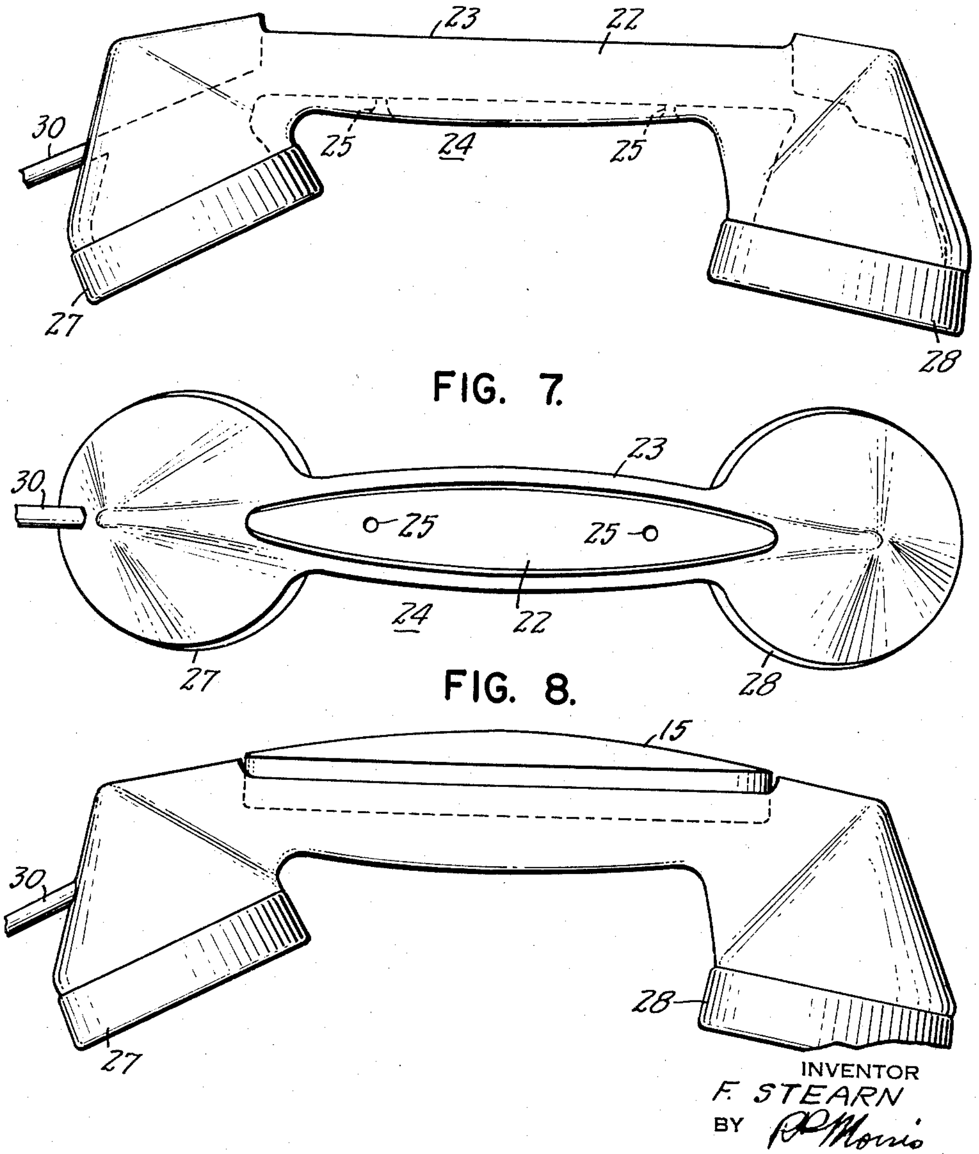
Fig. 6 is a side elevation of a telephone handset showing a cavity adapted to accommodate the rocker arm shown in Figs. 4 and 5.
Fig. 7 is a plan view of a telephone handset with a cavity adapted to receive the rocker arm shown in Figs. 4 and 5.
Fig. 8 is an elevation of a telephone handset with the rocker arm of Figs. 4 and 5 shown in operating position.

The assembled structure will appear as shown in Fig. 8. It will be apparent that by squeezing the outer surface of the rocker arm 15 at a point to the left of its middle and adjacent the transmitter 27, that one of the switches will be operated and that by squeezing the outer surface of that portion of the rocker arm 15 which is adjacent the receiver 28, the other of the switches will be operated. Thus, the rocker arm 15 may be readily actuated in either direction by the palm of the hand, while the fingers of the operator grip the interior surface of the handle in the normal telephone user's manner. When pressure is exerted on the rocker arm in the center thereof, neither switch will operate and the handset may be used in the normal manner.

There is an advantage in not having push button switches on the interior side of the handle, because such buttons may conceivably be actuated by the telephone cradle (not shown). The switch rocker lever here, however, is shown to be on the upper side of the handle and whilst the handset is in the cradle is not likely to be actuated accidentally. The rocker arm 15 is provided with a suitable slot or aperture 29, so that connecting wires (not shown) may be brought into the chamber 22 for connection to the lugs 1*b*, 1*c*, and 1*d* and 1′*b*, 1′*c* and 1′*d*, and which connecting wires associated with switches 1 and 1′, respectively, may be cabled in the telephone cord 30.

In assembling the structure, the frame 2 is placed within the vessel of the rocker arm 15 so that pivot 13 enters the space between the legs of the element 16. The threaded studs 27 are then introduced through the aperture 8 of the lugs 6 into the threaded ferrules 26 in the bottom of the vessel of rocker arm 15. Thereafter, the necessary conductors are connected to the terminals of the switches 1 and 1′ and the rocker arm 15 is then inserted within the cavity 22 of the handle 23 in a manner to conceal the frame 2 from view. Thereafter screws may be inserted from the interior side of handle 23 through apertures 25 into the threaded apertures 9 of lug portion 7 attached to frame 2.

While I have described above the principles of my invention in connection with specific apparatus, it is to be clearly understood that this description is made only by way of example and not as a limitation to the scope of my invention.

What is claimed is:

1. Apparatus for selectively operating electrical switching apparatus comprising a fixed mounting frame, a fixed pivot attached to said frame intermediate the ends thereof, a pair of electrical switches attached to said frame and disposed on opposite sides of said pivot, respectively, a movable lever having a portion adapted to rotate about said pivot, switch actuating means under control of said lever for operating a first one of said switches when said lever is rotated in a first direction about said pivot and for operating the other of said switches when said lever is rotated in the opposite direction, a pair of actuating pins attached to said lever disposed on opposite sides of said portion and a pair of resilient interponent members attached to said frame adjacent respective of said switches, said resilient members adapted to be interposed between said pins and said switches, respectively.

2. Apparatus as claimed in claim 1, wherein said switch actuating means comprises two pairs of spaced studs disposed on opposite sides of said pivot adjacent a respective switch, a pair of resilient interponent members, each cooperating with a different pair of said studs, each such interponent member retained by a first stud of said pair and adapted to be deformed around a portion of the other stud of said pair upon rotation of said lever.

3. Apparatus as claimed in claim 1, wherein said frame comprises a flat strip having pairs of opposed apertured lug portions normal to the plane of said strip, said lug portions in parallel planes, corresponding lug portions of each pair having a threaded aperture therein by means of which, to maintain said frame fixed to a fixed surface upon introduction of a suitable fastening device between said fixed surface and said apertures.

4. Apparatus as claimed in claim 2, wherein said resilient interponent members each comprise a generally hairpin shaped spring element, having legs of unequal length, a first part of the extended portion of the longer leg extending in a first plane normal to the plane of the other leg, the other part of said portion extending in a plane substantially parallel to the plane of said other leg, the end of the shorter of said legs adapted to abut against said first part upon actuation of said lever.

5. Apparatus as claimed in claim 2, wherein said lever comprises a pair of guide studs, said studs adapted to extend through the apertures in said other lug portions into said lever, said guide studs adapted to maintain said lever in rotatable relation with said pivot.

6. In combination, a telephone handset comprising a transmitter portion and a receiver portion, a handle interconnecting said portions, said handle having an inner portion adapted to rest upon a desk set cradle and an outer portion displaced 180° from said inner portion, and a selective switch controlling apparatus associated with said handset outer portion, said apparatus comprising an open hollow cavity within the outer portion of said handle and extending substantially all along the length of said handle, a switch control lever having a complementary configuration with said cavity and adapted to nest therein, said lever comprising a vessel-shaped member, a bifurcated element attached to the bottom of the vessel intermediate the ends thereof, a pair of actuating pins attached to the bottom of the vessel on opposite sides of said bifurcated element and extending in a direction parallel to the direction of said element, a pair of threaded ferrules extending into the base of the vessel at opposite ends thereof, a mounting frame adapted to be attached within the cavity in said handle, a fixed pivot extending from said frame, said pivot adapted to coact with the space between the legs of said bifurcated element, a pair of switch members attached to said frame on opposite sides of said pivot, said switch members being provided with operating elements, switch actuating interponent members attached to said frame adjacent said switch operating elements, said interponent members having portions adapted to be selectively moved by said actuating pins into contact with said switch operating elements, respectively, and guide means to movably couple said frame to said lever, said guide means adapted to pass through opposite ends of said frame and to be threaded into said ferrules, said lever adapted to be rotated upon said pivot to selectively actuate given of said switch members.

References Cited in the file of this patent

UNITED STATES PATENTS 2,587,399 Smith ---------------- Feb. 26, 1952